United States Patent
Karakaya (10) Patent No.: US 10,935,521 B2
(45) Date of Patent: Mar. 2, 2021

(54) AEROSOL PARTICLE MASS SENSOR AND SENSING METHOD

(71) Applicant: KONINKLIJKE PHILIPS N.V., Eindhoven (NL)

(72) Inventor: Koray Karakaya, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 610 days.

(21) Appl. No.: 15/312,695

(22) PCT Filed: May 18, 2015

(86) PCT No.: PCT/EP2015/060836
§ 371 (c)(1),
(2) Date: Nov. 21, 2016

(87) PCT Pub. No.: WO2015/180981
PCT Pub. Date: Dec. 3, 2015

(65) Prior Publication Data
US 2017/0184548 A1   Jun. 29, 2017

(30) Foreign Application Priority Data

May 30, 2014   (EP) .................................... 14170547

(51) Int. Cl.
*G01N 29/036*  (2006.01)
*G01N 5/02*  (2006.01)
*G01N 15/06*  (2006.01)

(52) U.S. Cl.
CPC ............. *G01N 29/036* (2013.01); *G01N 5/02* (2013.01); *G01N 15/06* (2013.01)

(58) Field of Classification Search
CPC ................................. G01N 29/036; G01N 5/02
USPC ........................................................ 73/24.03
See application file for complete search history.

(56) References Cited

U.S. PATENT DOCUMENTS

| | | | | |
|---|---|---|---|---|
| 3,653,253 A | * | 4/1972 | Olin | G01N 5/00 73/24.03 |
| 3,718,029 A | * | 2/1973 | Gourdine | G01N 27/60 324/464 |
| 4,041,768 A | * | 8/1977 | Gibert | G01N 29/036 73/24.03 |
| 6,510,727 B2 | * | 1/2003 | Reiter | G01N 15/0606 73/24.03 |
| 6,972,841 B2 | * | 12/2005 | Krempl | G01N 1/2252 356/338 |

(Continued)

FOREIGN PATENT DOCUMENTS

| | | |
|---|---|---|
| CN | 103623697 A | 3/2014 |
| JP | 08201267 A | 8/1996 |

(Continued)

*Primary Examiner* — John Fitzgerald
*Assistant Examiner* — Truong D Phan (57) ABSTRACT

A mass sensor is provided for measuring a particle mass within an aerosol. The duration of a sensing cycle is set such that a pre-set change in mass resulting from particles deposited is caused. In the absence of cleaning, the lifetime of the sensor is dependent on the total mass deposited. As a result, the lifetime is made essentially constant by this approach, because each sensing operation is made to give rise to a constant amount of deposited particle mass. This means the lifetime can be predicted more accurately.

15 Claims, 3 Drawing Sheets

(56) References Cited

U.S. PATENT DOCUMENTS

| | | | |
|---|---|---|---|
| 2003/0123059 A1* | 7/2003 | Krempl | G01N 1/2252 |
| | | | 356/338 |
| 2006/0011476 A1 | 1/2006 | Hada | |
| 2008/0011053 A1 | 1/2008 | Fleischer | |
| 2008/0087011 A1 | 4/2008 | Konsandopoulos | |
| 2008/0110537 A1 | 5/2008 | Marmaropoulos | |
| 2009/0183553 A1* | 7/2009 | Bhandarkar | G01N 21/783 |
| | | | 73/31.03 |
| 2010/0271003 A1* | 10/2010 | Jensen | H03D 1/02 |
| | | | 324/76.49 |
| 2011/0230788 A1* | 9/2011 | Anand | A61B 5/1126 |
| | | | 600/587 |
| 2014/0031263 A1 | 1/2014 | Norling | |

FOREIGN PATENT DOCUMENTS

| | | | |
|---|---|---|---|
| JP | 2011169884 A | | 9/2011 |
| JP | 2012220454 | * | 11/2012 |
| WO | 2013064157 A1 | | 5/2013 |

* cited by examiner

AEROSOL PARTICLE MASS SENSOR AND SENSING METHOD

This application is the U.S. National Phase application under 35 U.S.C. § 371 of International Application No. PCT/EP2015/060836, filed on May 18, 2015, which claims the benefit of International Application No. 14170547.5 filed on May 30, 2014. These applications are hereby incorporated by reference herein.

FIELD OF THE INVENTION

The invention relates to the measuring of particle mass within an aerosol.

BACKGROUND OF THE INVENTION

Airborne particle pollution, especially particle matter of size less than 2.5 μm diameter range (named "PM2.5"), is a big concern for countries like China, where the speed of industrialization stretches the boundaries of regulatory requirements.

As a consequence of increasing consumer empowerment, the demand for information about the air quality of living spaces is increasing. Especially in China, excessive PM2.5 pollution has become a common problem in the last decade. This problem is also validated by continuous measurements in various Chinese cities. The data is publicly available and can be simultaneously monitored by mobile phone applications or through the web.

Availability of this data as well as continuous national and international media attention has created strong consumer awareness about the problem.

Official outdoor air quality standards define particulate matter concentration as mass concentration per unit volume (e.g. $\mu g/m^3$). The average PM2.5 pollution concentration in mainland China has been calculated based on satellite data, and it has been found that the majority of the country exceeds the World Health Organization limits of 10 $\mu g/m^3$, with some regions reaching and even exceeding PM2.5 concentrations of 100 $\mu g/m^3$.

Standardized, reference measurement methods are based on measuring the mass of deposited or captured particles per air sampling volume, for example using a tapered resonator, an impactor, or weighing filters and sieves.

However, these systems require professional operational guidelines for handling the manual part of the measurement (e.g. weighing a filter and sieve) and/or periodic maintenance for cleaning the accumulated mass, maintaining various system components and recalibration. Moreover, they are typically large in dimensions for bench top use and not suitable for consumer applications.

Resonance based mass sensing for aerosol contamination monitoring has been proposed. For example, use of a micromachined silicon cantilever device with a picogram level of mass resolution for personal exposure monitoring has been proposed. Filters can be used for eliminating large particles and an electrostatic sampler can be provided for depositing nanoparticles on the cantilever. For example WO 2013/064157 discloses a MEMS based resonant particle measurement device, designed for measuring aerosol nanoparticles in an air flow stream.

However, the resonant particle measurement device has a problem that the end of the lifetime cannot be accurately estimated so user may replace the sensor too early or too late.

U.S. patent application publication No.: 20030123059A1 discloses a method and apparatus for determining the non-volatile component of aerosol particles in a gas sample. In specific, according to the mass sensor, a maximum mass load for the microbalance is preset, and a regeneration by heating will be caused when the maximum mass load is deposited. However, the mass change on the sensor element in each sensing cycle is not well controlled.

There is therefore a need for a mass sensor which can have a near constant lifetime regardless of the environment in which the sensor is used, and a better control of mass change in each sensing cycle, preferably with less mass change in a sensing cycle in case of high pollutant concentration.

SUMMARY OF THE INVENTION

The invention is defined by the claims.

According to an embodiment of the invention, there is provided a mass sensor for measuring a particle mass within an aerosol, comprising:

a sensor element;

a detector for detecting a mass of particles deposited on the sensor element wherein particles are deposited on the sensor element during the sensing cycle; and a controller for operating the detector during a sensing cycle, wherein the controller is adapted to set the duration of the sensing cycle such that during the sensing cycle a pre-set change in mass caused by particles deposited is caused.

The deposition of particles on the sensor is preferably limited to the time of the sensing cycles. The aerosol may be air or any other gas with entrained particles.

This sensor arrangement is controlled such that sensing takes place until a pre-set (additional) mass of particles is deposited on the sensor element.

Thus, for low concentrations of particles the sensing time is longer, and for large concentrations of particles the sensing time is shorter. In the absence of cleaning or a means of maintenance, the lifetime of the sensor is dependent on the total mass deposited. As a result, the lifetime is made essentially constant, because each sensing operation gives rise to a constant amount of deposited particle mass (i.e. the pre-set change in mass). This means the lifetime can be predicted more accurately. It also means the mass change for each sensing cycle can be reduced compared to the mass change which would be experienced based on fixed duration sensing when there is a heavy particle concentration.

Of course, in the event of extremely low concentrations, the sensing cycle can end even before the pre-set change in mass is caused. Thus, in this case, the pre-set change in mass is for particle concentrations above a threshold. In this case, the sensor output can indicate that the particle mass concentration is below a particular threshold. The deviation from a constant mass for those cycles does not add significant variation to the lifetime prediction because it relates only to sensing cycles where there is a very small deposited mass of particles.

The controller may further be adapted to:

derive from the sensing cycle duration a volume of aerosol which has been sampled, and thereby derive a particle concentration per unit volume.

This enables conversion of the sensed mass into a mass concentration.

In one implementation, the detector comprises a transducer element for driving the sensor element into resonance and detecting a resonance frequency of the sensor element, wherein the resonance frequency is dependent on the mass of particles deposited on the sensor element.

This implementation makes use of a resonant mass sensor. This can be implemented at low cost, for example for a consumer device and also in small dimensions for enabling portable/mobile use.

The controller may then further be adapted to:
measure an initial resonance frequency;
calculate a resonance frequency shift corresponding to the pre-set change in mass; and
monitor the resonance frequency to set the duration of the sensing cycle.

In this way, the sensor is essentially recalibrated at each sensing cycle.

Any resonance based sensor can be used which provides sufficient mass resolution, for example from picograms to milligrams. The sensor element may for example comprise a MEMS sensor. This enables a low cost and compact sensor to be fabricated. A MEMS sensor element may be formed as a clamped-clamped resonator beam or a clamped-free resonator beam.

For all embodiments, sample intake may be provided by the air flow driven by the appliance that the sensor is placed in; e.g. an air purifier. Alternatively a dedicated sample intake device may be provided for operating during the sensing cycle to drive the aerosol being monitored towards the sensor element. The sensor is then only exposed to the particulate aerosol during the sensing operation, so that the lifetime is prolonged.

The sample intake device can be a fan or a pump which may be supported with an electrostatic attraction arrangement that facilitates more efficient deposition of particles on the sensor element. Further alternatives comprise gravity based deposition of particles, or thermophoretic deposition, or use of natural convection.

A particle filter arrangement or an aerodynamic separator (e.g. impactor, virtual impactor, etc.) may be used for defining a range of particle sizes for which the aerosol particle mass is to be monitored. This means the mass concentration can be measured only for a range of particle sizes of interest.

An embodiment of the invention also provides a method of measuring particle mass within an aerosol, comprising:
detecting a mass of particles deposited on a sensor element during a sensing cycle; and
setting the duration of the sensing cycle such that during the sensing cycle a pre-set change in mass caused by particles deposited is caused.

This method operates the sensor until a certain mass of particles is deposited on the sensor element. As explained above, this method means the lifetime is made essentially constant, so it can be predicted more accurately.

The invention also provides an air treatment device, comprising a mass sensor of the invention.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a mass sensor for measuring particle mass within an aerosol. The duration of a sensing cycle is set such that a pre-set change in mass resulting from particles deposited is caused. In the absence of cleaning, the lifetime of the sensor is dependent on the total mass deposited. As a result, the lifetime is made essentially constant by this approach, because each sensing operation is made to give rise to a constant amount of deposited particle mass. This means the lifetime can be predicted more accurately.

In addition to the MEMS based sensor described in WO 2013/064157, other approaches for determining the mass of a collected sample include measuring the thermal capacity of an accumulated mass, or measuring an attenuation of an interrogation signal, for example as used by a beta attenuation monitor.

These sensing approaches all have the issue that there is a sensing limit which is reached when the accumulated mass exceeds a certain level. For example, the accumulated mass during a measurement cycle becomes a smaller fraction of the overall accumulated mass, so that the system will eventually reach a resolution limit.

For example, mass sensors which operate based on resonance operate in a range where the added mass is small compared to the initial resonator mass. However, continuous mass accumulation during the lifetime of the sensor is inevitable. This problem is more pronounced for MEMS scale devices, in which mechanical and/or chemical cleaning of the accumulated mass is not possible—at least for consumer applications.

Therefore, the lifetime of a MEMS mass sensor can be roughly estimated by considering the initial mass and the approximate mass deposition per measurement cycle.

A problem arises that the rate of mass deposition is dependent on the environment in which the device is used, and this applies to all sensors which measure a mass which is accumulated. This makes it difficult to predict the lifetime of the device, and/or the timing of a preventive maintenance. Methods and sensors according to embodiments of the invention is developed to address the above-mentioned issues.

The invention will be described in detail with reference to a resonant mass sensor. However, other mass sensing approaches may be used which can also benefit from the invention.

Direct mass measurement using resonant devices is a known technique. It is based on the relationship between the resonance frequency ($f_0$) and the mass of a resonator, as shown in FIG. 1.

Figure 1:
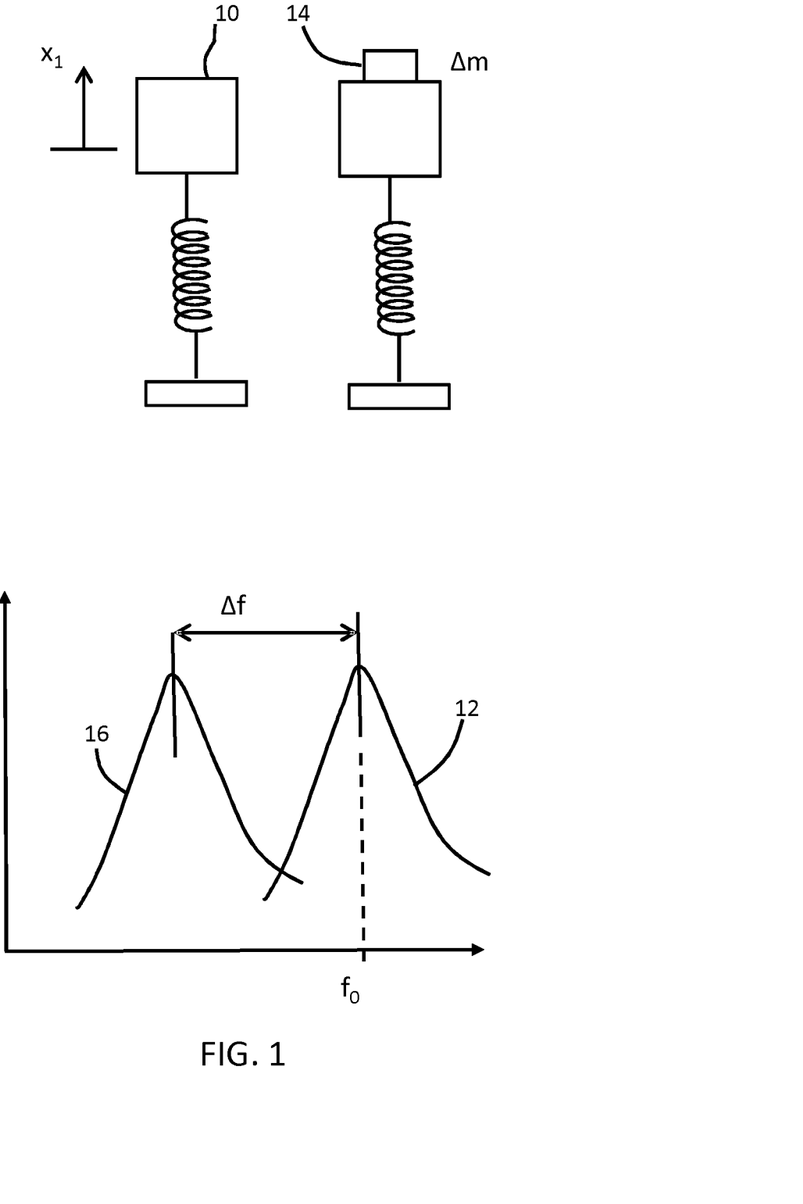
FIG. 1 shows the fundamental aspects of a resonance based mass detection, explained with a spring-mass system, where the mass of the resonator sensor influences the resonance frequency.

In FIG. 1, a resonator mass 10 is represented schematically, with a mass m and spring constant k. The graph shows the amplitude of the resonant oscillations (on the y-axis) as a function of frequency (the x-axis). Plot 12 is for the basic resonator mass. If an additional mass 14 is added ($\Delta m$) the oscillation curve shifts down in frequency to plot 16 with a frequency shift $\Delta f$.

The equations which govern the resonant vibrations are:

$$f_0 = \frac{1}{2\pi}\sqrt{\frac{k}{m}} \quad (1)$$

$$\Delta f = -\frac{1}{2}\frac{\Delta m}{m}f_0 \quad (2)$$

$$\Delta m_{min} \propto \frac{m}{Q} \quad (3)$$

Equation 1 shows the relationship between the basic resonance frequency and the resonator characteristics. Equation 2 shows the change in frequency caused by a change in mass, and equation 3 shows the minimum mass ($\Delta m_{min}$) that can be detected. The minimum depends on the mechanical quality factor Q of the resonator.

There are several examples of resonance based mass sensing for aerosol contamination monitoring in literature. For example, use of a micromachined silicon cantilever device with a picogram level of mass resolution for personal exposure monitoring has been proposed. Filters can be used for eliminating large particles and an electrostatic sampler can be provided for depositing nanoparticles on the cantilever.

For example WO 2013/064157 discloses a MEMS based resonant particle measurement device, designed for measuring aerosol nanoparticles in an air flow stream.

As a rule of thumb, mass sensors operate in a range where the added mass is small compared to the initial resonator mass. However, continuous mass accumulation during the lifetime of the sensor is inevitable. This problem is more pronounced for MEMS scale devices, in which mechanical and/or chemical cleaning of the accumulated mass is not possible—at least for consumer applications. Therefore, the lifetime of a MEMS mass sensor can be roughly estimated by considering the initial mass and the approximate mass deposition per measurement cycle.

A brief calculation is given below, as an example for a silicon MEMS cantilever:
Dimensions: 100 μm width, 1000 μm length, 10 μm thick
Volume: $10^6$ μm$^3$
Mass: 2650 ng (silicon density 2.65 g/cm$^3$)

For a minimum particle concentration detection limit of 10 μg/m$^3$ (World Health Organization limit for annual mean concentration), and a sample air volume of 1 liter (1 min sampling with 1 l/min air intake), 10 ng of mass deposition on the resonator is a reasonable estimate. For increasing concentrations, the mass deposition increases proportionally. This results in a number of measurement cycles to double the original mass of the resonator which depends on the concentration ranges, as summarized below:

| PM 2.5 concentration (μg/m$^3$) | Absolute mass per sampled volume of 1 l (ng) | Number of cycles (#) |
|---|---|---|
| 10 | 10 | 265 |
| 20 | 20 | 132 |
| 50 | 50 | 53 |
| 100 | 100 | 26 |

The PM2.5 concentration can reach several hundreds of μg/m$^3$ (e.g. 700 μg/m$^3$ in Beijing, Jan. 13, 2013), so that an even shorter lifetime can result, which is not appropriate for using such systems at consumer level applications.

The sensor system can be designed by considering an average particle concentration over an operational lifetime. However, the large variations in concentration always brings the risk of premature and unpredictable end of operational lifetime.

The conventional way to use a mass sensor system is based on measuring the concentration of the accumulated mass for a predefined sample volume. The measurement is done by comparing the resonance frequency of the sensor at the beginning, and at the end of the measurement cycle, and correlating the frequency shift to the mass change ($\Delta m$).

This requires a predefined sample intake time; e.g. by means of flowing air over the sensor for a given period of time.

Figure 2:
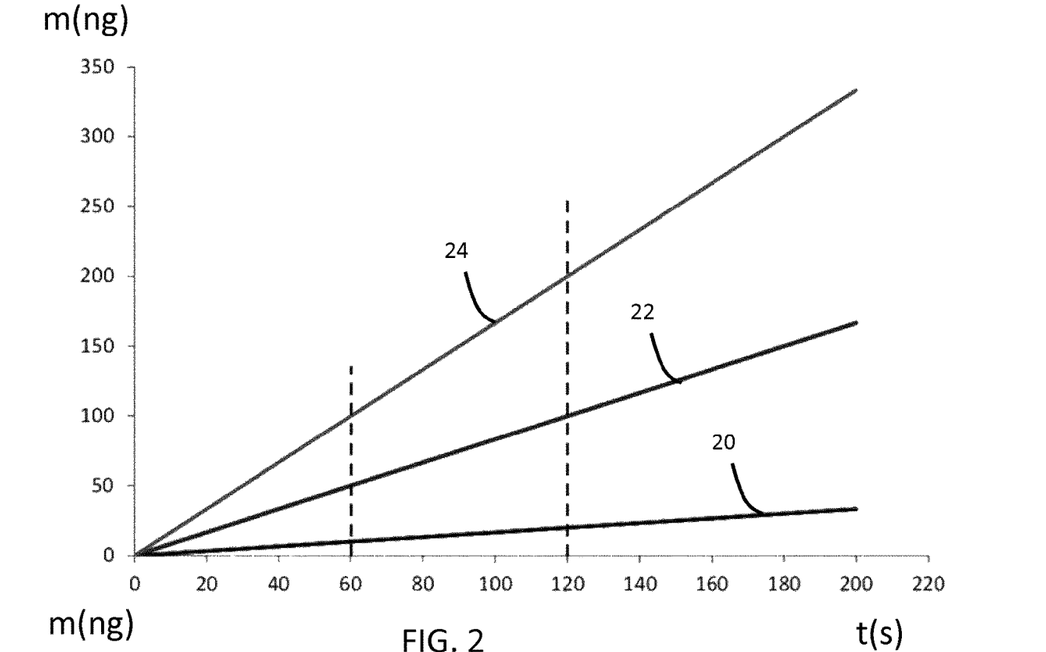
FIG. 2 shows the conventional approach of sampling an aerosol for a fixed time period.

FIG. 2 shows a conventional sensor reading approach and shows the accumulated mass as a function of time.

Plot 20 is for a low concentration of 10 μg/m$^3$, plot 22 is for a medium concentration of 50 μg/m$^3$ and plot 24 is for a high concentration of 100 μg/m$^3$.

As can be seen from the figure, the accumulated mass for a given sample time (e.g. 60 s and 120 s as shown) depends on the concentration.

The lifetime of a mass sensor which operates by detecting changes in resonance frequency thus strongly depends on the concentration of particulate matter. Variations in pollution levels bring an unpredictability issue for lifetime; hence limit the applicability of these sensors for consumer applications.

Figure 3:
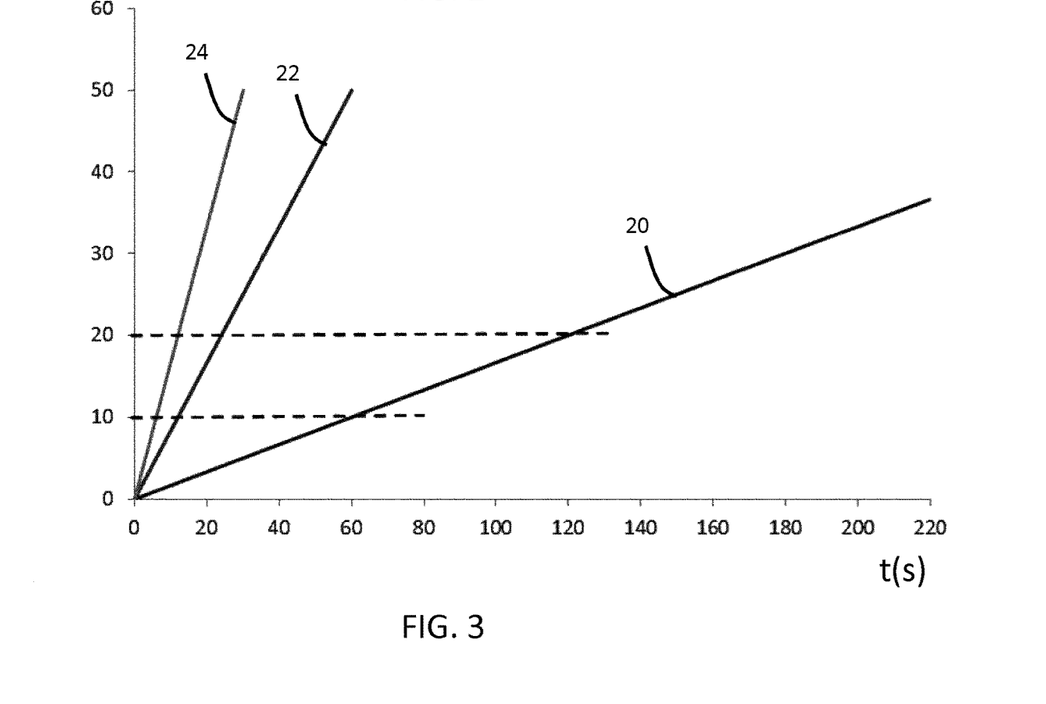
FIG. 3 shows the approach of an embodiment of the invention of sampling an aerosol for a fixed mass accumulation.

FIG. 3 is used to explain the sensing approach in accordance with embodiments of the invention. Again, plot 20 is for a low concentration of 10 μg/m$^3$, plot 22 is for a medium concentration of 50 μg/m$^3$ and plot 24 is for a high concentration of 100 μg/m$^3$. The plots are given different slopes to FIG. 2 to enable the approach to be seen more clearly.

The sensor is controlled to set the duration of the sensing cycle such that during the sensing cycle a pre-set change in mass caused by particles deposited is caused. Two examples are shown in FIG. 3, for an accumulated mass of 10 ng and 20 ng.

This sensor operating procedure ensures a certain lifetime of the mass sensor. A fixed mass accumulation value is defined for the sensor and the operation has a variable sampling time. In this way, the sensor system operates short sampling times for high concentration, and long sampling times for low concentrations. The concentration is then calculated by the total sample volume until reaching the predefined mass accumulation.

A maximum sampling time may be set so that the sampling ends at a certain point of time even for extremely low concentrations. In this case, the sensor output will indicate that the concentration is below a threshold rather giving an absolute value. Thus, the constant mass sample is applied for particle concentrations above a threshold, and below this threshold a maximum sampling time can be applied. The concentration may for example be the lowest concentration which needs to be detected for the particular application, and the duration of the maximum sampling time will be selected accordingly. Thus, the actual level of concentration below that threshold is not of interest. The addition of a range of fixed duration sampling times for low concentrations will result in extension of the lifetime of the sensor beyond the designed lifetime based only on constant mass measurements.

As can be seen from FIG. 3, the sampling time required for achieving a certain mass accumulation is inversely proportional to the pollution level in the air. This prevents excessive mass accumulation on the resonator, which causes short and unpredictable lifetime. Although the predefined mass is indicated as 10 ng or 20 ng in this example, these values can of course be selected depending on the particular resonator design.

Figure 4:
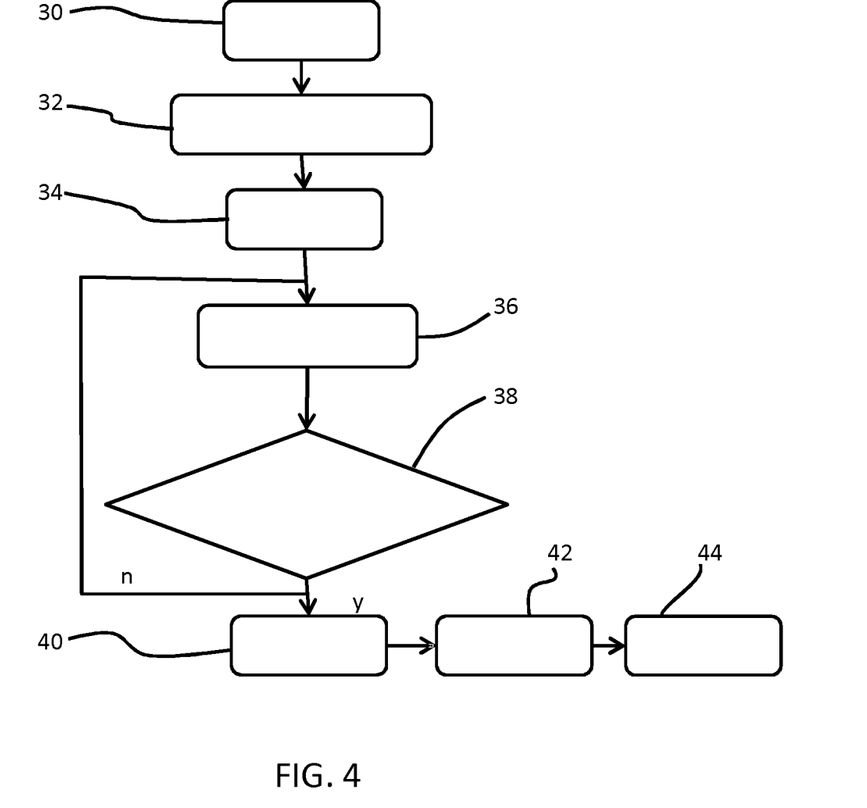
FIG. 4 shows an embodiment of the method of the invention.

FIG. 4 shows how the particulate matter concentration in the air is calculated.

In step 30, the initial resonance frequency ($f_0$) is measured (i.e. at time $t_0$).

In step 32 the resonance frequency shift ($\Delta f$) which will result from a predefined mass accumulation ($\Delta m$) is obtained. This defines a target value of the shift in resonance frequency, $\Delta f_{target}$.

The target value may be obtained based on calculations, or else a look up table may be addressed.

The cycle starts in step 34, for example by starting an air intake (for example with a fan, at a known air flow rate). In step 36, the resonance frequency is monitored continuously, so that the change in resonance frequency $\Delta f$ is monitored.

When the previously calculated resonance frequency shift ($\Delta f_{target}$) is reached as determined in step 38, the sampling ends. The sampling time is output in step 40, i.e. the time since $t_0$.

The sample volume V is calculated in step 42 (V=air flow rate×sampling time).

In step 44 the particle concentration (C=mass/V) is calculated, for example in units $\mu g/m^3$.

This approach provides a certain number of measurement cycles for the lifetime of the sensor, regardless of the concentration in the air. In this way, a mass sensor can be designed for direct measurement of particulate concentration in air with a predictable lifetime required for consumer applications.

The detailed design of the sensor will depend on the application conditions and should be selected in correspondence to the expected limit of detection, expected lifetime, the capabilities of the driving and detecting electronics (e.g. operation frequency range).

Figure 5:
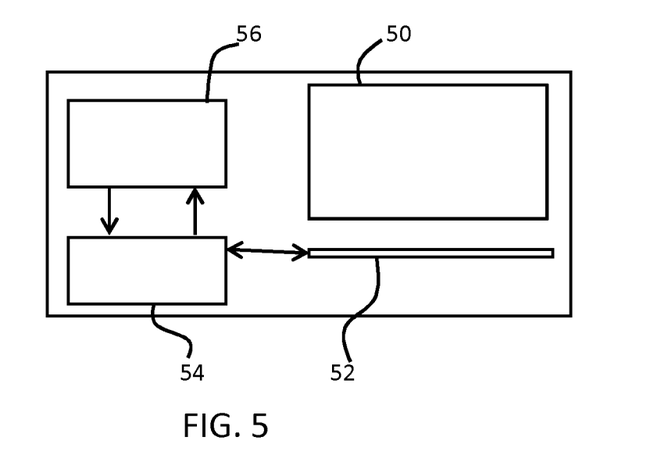
FIG. 5 shows an embodiment of the sensor of the invention.

In general, as shown in FIG. 5, the sensor system comprises a particle pre-classification unit and intake sampling device 50 (e.g. a filter stack and fan or other arrangement), a MEMS resonator 52 (described below), an electronic circuit 54 for driving and reading out the sensors and other system components and a controller 56 for data processing and storage. Air flow to the sensor unit can be handled by, for example, using fans and/or thermal convection.

The sample intake and conditioning unit 50 is designed taking into account the targeted particle size range. A specific particulate matter range (e.g. PM1, PM2.5, PM10) may be targeted by using appropriate particle size pre-classification methods; e.g. a mesh/filter combination or inertial/aerodynamic separation. Providing enough sample air volume, consistently over the service lifetime is the key parameter for designing such a system. Particle filters such as fibrous filters, meshes, inertial or aerodynamic separation units may be used for particle selection.

Deposition of the particles can be controlled by electrostatic or electrophoretic precipitation of charged particles on a grounded or oppositely biased resonator. Thermophoretic precipitation may instead be used which comprises creating a temperature difference between the resonator and a counter surface. The deposition may instead be based on random particle movement.

A fan or pump for delivering the sampled air volume may also be used to design the system to be compatible with this key parameter.

The selection depends on the minimum detectable mass, average particle concentration in 'clean air' (baseline level), ratio of particles passing through the particle filters in sampling subsystem and eventually the user requirements for minimum particle concentration detection.

A MEMS resonator may be used as the mass sensor element 52. The resonator can be designed and fabricated with suitable dimensions to achieve the desired resonance frequency for providing the required limit of detection.

Examples of possible resonator structures are cantilevered structures (one end clamped, other end free), as well as double-clamped or membrane type resonators.

A cantilevered design may be of particular interest for providing sufficient electric field density at the cantilever tip in the case of electrostatic particle collection. A cantilevered structure can be in simple rectangular form, in triangular form (for a larger clamping area) or in hammerhead-like form for increasing the surface area while maintaining the low area at the clamped end.

These parameters all affect the resonance behavior of the system and basic resonator design principles can be used.

The circuitry 54 for driving and reading out the resonance frequency also depends on the mechanical quality factor (Q-value) of the resonator, choice of transducer (e.g. piezoelectric, thermal, piezoresistive, optical, capacitive, etc.). Depending on the requirements for minimum detectable mass, a Q-compensation mechanism may be implemented for increasing the mass resolution of the system. The detection of the resonance frequency in the electronic domain is selected to be suitable for the actuation method. Fundamentals of circuit design for such resonators are known in literature.

For example, in the case of piezoelectric actuation and sensing, an oscillator circuit is used which incorporated the electrical impedance of the resonator. In the case of electrostatic/capacitive actuation and sensing a voltage controlled oscillator circuit is used.

The controller 56 for data processing and handling can also be selected and designed depending on the application requirements such as the data sampling rate, processing load for calculations and implementation of data processing algorithms.

The mass sensor provides an output which indicates the concentration of particles of a particular size range. This information may be used to control an air treatment device. For example, a high recorded mass indicating high levels of pollution can give rise to a high capacity mode of operation (e.g. by selecting a high fan speed setting for an air purifier device), and a low recorded mass can give rise to a lower capacity mode of operation. In this way, energy savings are obtained, and the lifetime of the air purifier device can be prolonged. In the case of an air treatment device which controls the air properties of a space by using air intake from outdoors, the mass sensor reading can be used for regulating the air intake from outdoors, for example depending on whether or not the outdoor air pollution exceeds the system requirements.

The invention provides a sensing cycle of a variable duration. However, each sensing cycle may be carried out with a fixed period. For example, sensing may be carried out every X minutes, where X will depend on the rate at which pollution levels are expected to change in the environment being monitored, and the speed with which the controlled system (such as an air purifier) needs to respond. For example, the pollution levels may be recorded every 1 to 30 minutes, and the individual sensing cycle may have a maximum duration that provide sufficient granularity for the desired sampling interval; e.g. 1-10 seconds for a 1 minute sampling interval, or 1-10 minutes for a 30 minutes sampling interval.

The sampling interval can also be depending on the presence of 'users' in the environment; for example can be further prolonged when air treatment unit is not in continuous operation due to absence of users.

The controller will then instruct a sensor read out operation every X minutes. For a given value X, the overall lifetime of the mechanical sensor will be essentially constant.

However, the frequency of the sensor measurements may be set by the user, or else may depend on the particular use of the sensor, for example depending how quickly it is desired for changes to be made in response to changes in mass sensor reading.

The sensor readings may be provided to the user as an output, for example using a display screen. The user can then process and respond to the information accordingly, and the mass sensor can be a stand alone sensor device. Alternatively, the sensor readings may function as an internal control parameter within a larger system, which reacts automatically in response to detected levels of pollution. This larger system may be an air purifier or other air quality control system.

The fact that the individual measurement cycles are of variable duration depending on the pollution level will not be perceived by the user. The variable duration simply means that different sensor measurements have required different periods of sensor operation. The advantage is that the overall lifetime of the sensor can be specified more accurately.

The invention has been described above with reference to a resonant mass sensor, and this is of particular interest as it can be implemented at low cost for consumer devices. However, the problem of unpredictable lifetime arises for any mass sensor which relies upon the analysis of an accumulated mass during a sensing cycle. As the accumulated mass increases, the relative change in mass during a sensing cycle becomes reduced, so the resolution drops with age until a limit is reached. Similarly, there may be an absolute limit to the amount of mass that can be accumulated by the sensor design.

A first alternative approach is to measure a thermal capacity of an accumulated mass. This is another relatively simple method, but the accuracy depends on the thermal properties of the aerosols, which may be unknown.

A second alternative approach is to measure radiation attenuation. This approach is for example known in beta attenuation monitors. The measurement will be accurate, but this approach requires a radiation source, which may not be practical for a consumer device. Thus, this approach may be more suitable for professional measurement systems. However, MEMS scale X-ray generators have started to appear in the literature, which offer the potential for use in a consumer device.

A third alternative approach is to use optical monitoring of the accumulated mass.

The invention is applicable to air purifiers, stand-alone particle sensor units, personal exposure monitoring devices, vehicle cabin particle measurement sensors, particle sensors for outdoor use (as a standalone sensor unit or for example, sensors for lamp posts for city management), ventilation units, various parts of a building climate management system and in general various types of mass sensors. There are also medical applications in respiratory support and drug delivery applications.

The examples above are based on detection of PM2.5 particles, but the invention can be applied to PM10, PM1 particles or other categories of ultrafine particles.

The example above is based on a MEMS resonator. However, the approach can be based on other micro resonators, for example a membrane device (similar to a capacitive micro machined ultrasound transducer) or a quartz crystal microbalance (QCM). The resonator may be a bulk acoustic wave (BAW) resonator, or a surface acoustic wave resonator (SAW).

The system makes use of a controller. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A mass sensor for measuring particle mass within an aerosol, comprising:
   a sensor element;
   a detector for detecting a mass of particles deposited on the sensor element; and
   a controller for operating the detector during a sensing cycle for performing a sensing operation,
      wherein particles are deposited on the sensor element during the sensing cycle,
      wherein a lifetime of the sensor element over a successive plurality of sensing cycles is dependent on a total mass deposited on the sensor element during the successive plurality of sensing cycles, and
      wherein the controller is adapted to set an end of a duration of the sensing cycle such that a resonance frequency shift ($\Delta f$) of the sensor element during the sensing cycle corresponds to a pre-set change in a mass of the sensor element caused by the mass of particles deposited on the sensor element.

2. A mass sensor as claimed in claim 1, wherein the controller is further adapted to:
   derive from the sensing cycle duration a volume of aerosol which has been sampled, and thereby derive a particle concentration per unit volume.

3. A mass sensor as claimed in claim 1, further comprising a sample intake device for operating during the sensing cycle to drive the aerosol being monitored towards the sensor element.

4. A mass sensor as claimed claim 1, further comprising a particle filtration arrangement for selecting a range of particle sizes for which the particle mass is to be measured.

5. An air treatment device, comprising a mass sensor as claimed in claim 1.

6. A mass sensor as claimed in claim 1,
wherein the detector comprises a transducer element for driving the sensor element into resonance and detecting a resonance frequency of the sensor element, and
wherein the resonance frequency of the sensor element is dependent on the mass of particles deposited on the sensor element.

7. A mass sensor as claimed in claim 6, wherein the controller is further adapted to:
measure an initial resonance frequency ($f_0$) of the sensor element;
calculate the resonance frequency shift ($\Delta f$) corresponding to the pre-set change in the mass of the sensor element; and
monitor the resonance frequency of the sensor element to set the end of the duration of the sensing cycle.

8. A mass sensor as claimed in claim 1, wherein the sensor element includes a MEMS sensor.

9. A mass sensor as claimed in claim 8, wherein the sensor element includes a clamped-clamped resonator beam or a clamped-free resonator beam.

10. A method of measuring particle mass within an aerosol, comprising:
detecting a mass of particles deposited on a sensor element during a sensing cycle thereby performing a sensing operation; and
setting an end of a duration of the sensing cycle such that a resonance frequency shift ($\Delta f$) of the sensor element during the sensing cycle corresponds to a pre-set change in a mass of the sensor element caused by the mass of particles deposited on the sensor element,
wherein a lifetime of the sensor element over a successive plurality of sensing cycles is dependent on a total mass deposited on the sensor element during the successive plurality of sensing cycles.

11. A method as claimed in claim 10, further comprising:
deriving from the set sensing cycle duration a volume of aerosol which has been sampled; and deriving a particle concentration per unit volume.

12. A method as claimed in claim 10, further comprising controlling a sample intake device during the sensing cycle to drive the aerosol being monitored towards the sensor element.

13. A method as claimed in claim 10, further comprising performing particle filtering for selecting a range of particle sizes for which the particle mass is to be measured.

14. A method as claimed in claim 10, wherein the detecting comprises:
driving the sensor element into resonance during the sensing cycle; and
detecting the resonance frequency of the sensor element, wherein the resonance frequency is dependent on the mass of particles deposited on the sensor element.

15. A method as claimed in claim 14 comprising:
measuring an initial resonance frequency ($f_0$) of the sensor element at a start of the sensing cycle;
obtaining the resonance frequency shift ($\Delta f$) corresponding to the set change in the mass of the sensor element; and
monitoring the resonance frequency of the sensor element until the resonance frequency shift has occurred in order to set the end of the duration of the sensing cycle.

* * * * *